US012614112B2

(12) United States Patent
San et al.

(10) Patent No.: US 12,614,112 B2
(45) Date of Patent: Apr. 28, 2026

(54) JUDGING METHOD FOR A MODULE PEELING TIME OF A SOFT ELECTRONIC FABRIC MODULE AND A SYSTEM APPLYING THE SAME

(71) Applicant: INDUSTRIAL TECHNOLOGY RESEARCH INSTITUTE, Hsinchu (TW)

(72) Inventors: Cheng-Hung San, Xinpu Township (TW); Hsin-Chung Wu, Sihu Township (TW); Ming-Hong Chiueh, Taipei City (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 746 days.

(21) Appl. No.: 18/089,108

(22) Filed: Dec. 27, 2022

(65) Prior Publication Data

US 2024/0177055 A1     May 30, 2024

(30) Foreign Application Priority Data

Nov. 28, 2022     (TW) ................................. 111145483

(51) Int. Cl.
G05B 19/418     (2006.01)
G06N 7/01     (2023.01)
G06N 20/00     (2019.01)

(52) U.S. Cl.
CPC .............. G06N 20/00 (2019.01); G06N 7/01 (2023.01)

(58) Field of Classification Search
CPC .................................................... G05B 19/418
See application file for complete search history.

(56) References Cited

U.S. PATENT DOCUMENTS 8,990,149 B2     3/2015   Danciu et al.
10,902,539 B2    1/2021   Rodriguez et al.
(Continued)

FOREIGN PATENT DOCUMENTS

CN     103914581 A     7/2014
CN     107480126 A     12/2017
(Continued)

OTHER PUBLICATIONS

Taiwanese Office Action and Search Report for Taiwanese Application No. 112133090, dated Feb. 29, 2024.

*Primary Examiner* — Suresh Suryawanshi

(74) *Attorney, Agent, or Firm* — Birch, Stewart, Kolasch & Birch, LLP

(57)     ABSTRACT

A judging method for a module peeling time of a soft electronic fabric module is provided. The method includes: preselecting a plurality of module material combinations, the plurality of module material combinations respectively comprising a substrate material, a wire material and a packaging material; extracting the plurality of module material combinations to generate a plurality of module material combination parameters; generating a plurality of machine learning training data based on the plurality of module material combination parameters and a plurality of module pre-processing conditions; and training a machine learning model according to the plurality of machine learning training data to provide an optimized prediction model for judging a module peeling time.

15 Claims, 7 Drawing Sheets

10S

(56)        References Cited

U.S. PATENT DOCUMENTS

| | | | |
|---|---|---|---|
| 11,073,826 B2 | 7/2021 | Cella et al. | |
| 2010/0155131 A1 * | 6/2010 | Fan ..................... H05K 9/0084 | |
| | | | 174/378 |
| 2010/0179930 A1 | 7/2010 | Teller et al. | |
| 2019/0121333 A1 | 4/2019 | Cella et al. | |
| 2019/0324442 A1 | 10/2019 | Cella et al. | |
| 2020/0008299 A1 | 1/2020 | Tran et al. | |
| 2021/0098129 A1 | 4/2021 | Neumann | |
| 2021/0406605 A1 | 12/2021 | Oleson et al. | |
| 2022/0053811 A1 * | 2/2022 | Eichenlaub ........ G05B 13/0265 | |
| 2022/0067570 A1 | 3/2022 | Kong et al. | |
| 2022/0082508 A1 | 3/2022 | Isken et al. | |

FOREIGN PATENT DOCUMENTS

| | | | | |
|---|---|---|---|---|
| CN | 109313670 A | | 2/2019 | |
| CN | 109901742 A | * | 6/2019 | |
| CN | 109902379 A | | 6/2019 | |
| CN | 111128311 A | | 5/2020 | |
| CN | 111597735 A | | 8/2020 | |
| CN | 113011057 A | | 6/2021 | |
| CN | 113408110 A | | 9/2021 | |
| CN | 113449526 A | | 9/2021 | |
| CN | 113505853 A | | 10/2021 | |
| CN | 114386512 A | | 4/2022 | |
| CN | 115345121 A | | 11/2022 | |
| JP | 2001053405 A | * | 2/2001 | |
| TW | 201338085 A | * | 9/2013 | ............. H01L 24/96 |
| TW | 201939365 A | | 10/2019 | |
| TW | 202036168 A | | 10/2020 | |
| TW | 202111567 A | | 3/2021 | |
| WO | WO-2021221372 A1 | * | 11/2021 | ........... G06T 7/0004 |

* cited by examiner

10S

JUDGING METHOD FOR A MODULE PEELING TIME OF A SOFT ELECTRONIC FABRIC MODULE AND A SYSTEM APPLYING THE SAME

This application claims the benefit of Taiwan application Serial No. 111145483, filed Nov. 28, 2022, the disclosure of which is incorporated by reference herein in its entirety.

TECHNICAL FIELD

The disclosure relates in general to a judging method for a module peeling time and a system applying the same, and more particularly to a judging method for a module peeling time of a soft electronic fabric module and a system applying the same.

BACKGROUND

Recently, there is an increasing demand for soft electronic fabrics (i.e., wearable devices). During the manufacturing process of a soft electronic fabric module, the module peeling of the soft electronic fabric module may occur. At present, the judging method for the module peeling of the soft electronic fabric module in the market are still quite time-consuming and effort-consuming. Therefore, how to propose a judging method that can improve the above-mentioned problems is a goal that practitioners in the field are constantly striving for.

SUMMARY

The disclosure relates to a judging method for a module peeling time of a soft electronic fabric module and a system applying the same. The judging method in the present application is an automated judging method for the module peeling time, in which a machine learning model is trained with machine learning training data generated based on module pre-processing conditions, which can quickly and accurately judge the module peeling time.

According to one embodiment, a judging method for a module peeling time of a soft electronic fabric module is provided. The method comprises: preselecting a plurality of module material combinations, the plurality of module material combinations respectively comprising a substrate material, a wire material and a packaging material; extracting the plurality of module material combinations to generate a plurality of module material combination parameters; generating a plurality of machine learning training data based on the plurality of module material combination parameters and a plurality of module pre-processing conditions; and training a machine learning model according to the plurality of machine learning training data to provide an optimized prediction model for judging a module peeling time.

According to another embodiment, a judging method for a module peeling time of a soft electronic fabric module is provided. The method comprises: preselecting a plurality of module material combinations, the plurality of module material combinations respectively comprising a substrate material, a wire material and a packaging material; extracting the plurality of module material combinations to generate a plurality of module material combination parameters; generating a plurality of machine learning training data based on the plurality of module material combination parameters and a plurality of module pre-processing conditions; and training a machine learning model according to the plurality of machine learning training data to provide an optimized prediction model for judging a module peeling time, wherein a heat resistance of the substrate material is 155° C. to 200° C., and a thermal expansion coefficient of the substrate material is 7 $10^{-6}$/K to 147 $10^{-6}$/K; a heat resistance of the wire material is 155° C. to 300° C., and a thermal expansion coefficient of the wire material is 117 $10^{-6}$/K to 264 $10^{-6}$/K; a heat resistance of the packaging material is 100° C. to 200° C., and a thermal expansion coefficient is 16 $10^{-6}$/K to 380 $10^{-6}$/K.

According to an alternative embodiment, a prediction system for a module peeling time of a soft electronic fabric module is provided. The soft electronic fabric module comprises: a data collection system, preselecting a plurality of module material combinations, wherein the plurality of module material combinations respectively comprises a substrate material, a wire material and a packaging material; a measuring device, extracting the plurality of module material combinations to generate a plurality of module material combination parameters; a lamination device, performing a plurality of module pre-processing conditions to the plurality of module material combinations; an environmental testing device, measuring a plurality of module peeling time for training of the plurality of module material combinations after performing the plurality of module pre-processing conditions; and a model building system, generating a plurality of machine learning training data based on the plurality of module material combination parameters and the plurality of module peeling time for training, and training a machine learning model according to the plurality of machine learning training data to provide an optimized prediction model for judging a module peeling time.

Figure 1A:
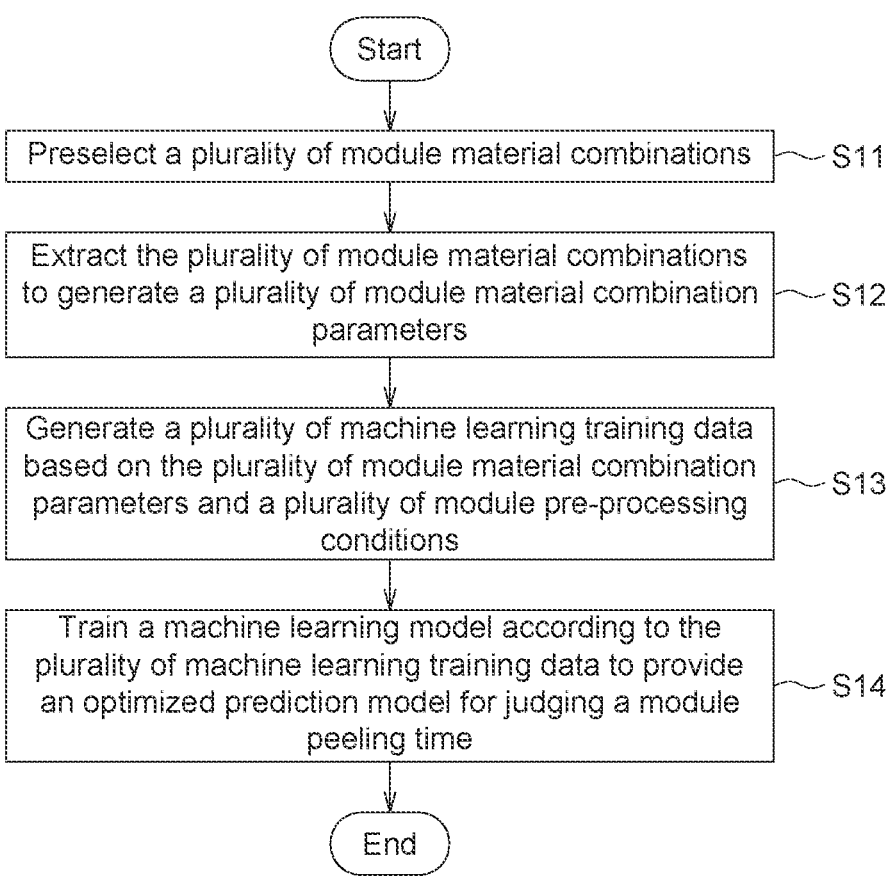
FIG. 1A illustrates a judging method for the peeling time of a soft electronic fabric module according to an embodiment of the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

Embodiments of the present disclosure will be described in detail below in conjunction with the accompanying drawings. It should be noted that the drawings are not drawn to scale. In fact, the dimensions of the components may be arbitrarily enlarged or reduced to clearly demonstrate the present disclosure. In the description and drawings, the same or similar elements will be represented by similar symbols.

Many different implementation methods or examples are disclosed below to implement different features of the present disclosure, and specific elements and examples of their arrangement are described below to illustrate the present disclosure. Of course, these are only examples and do not limit the scope of the present disclosure. Furthermore, it should be understood that there may be additional operation steps before, during or after the method, and some of the above operation steps may be replaced or deleted in the methods of other embodiments.

Figure 1B:
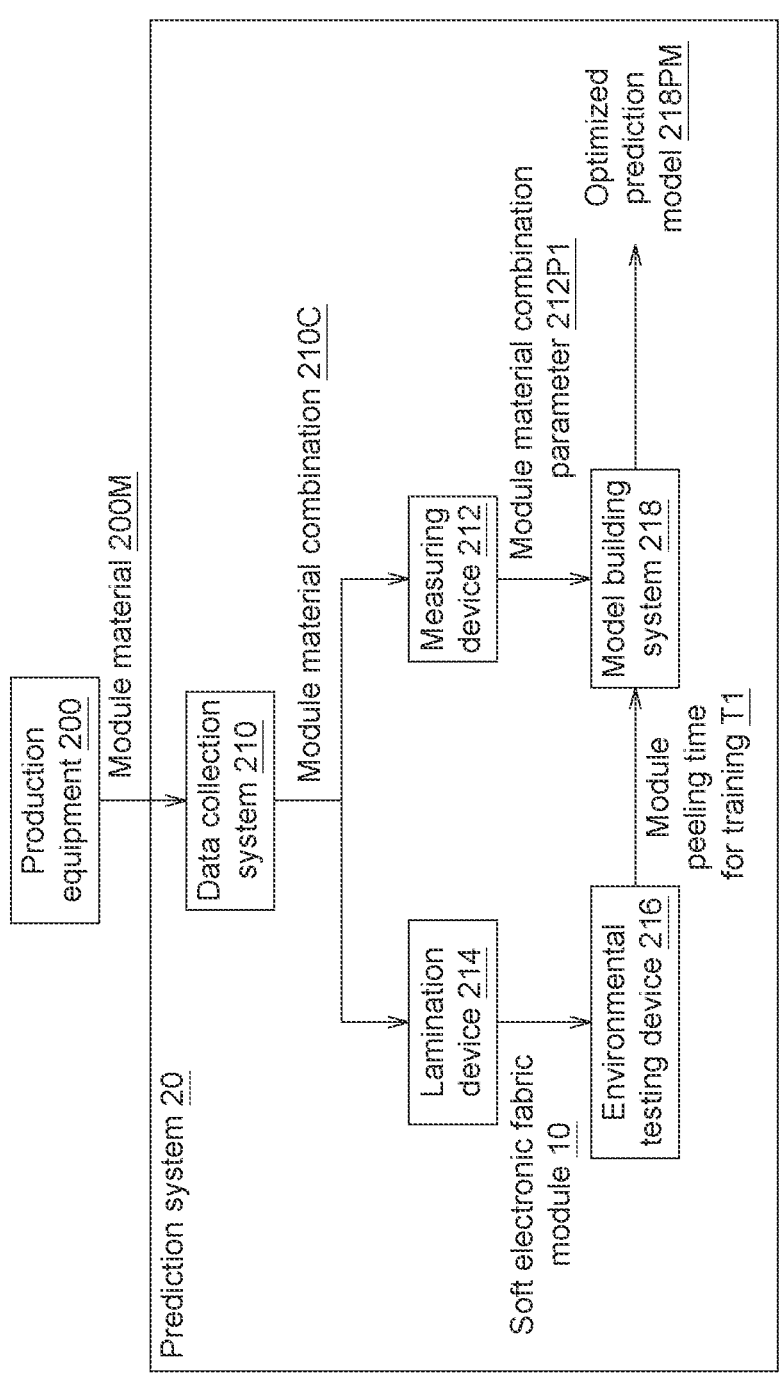
FIG. 1B illustrates a prediction system for a module peeling time of the soft electronic fabric module according to an embodiment of the present disclosure.

FIG. 1A illustrates a judging method 10S for the module peeling time of a soft electronic fabric module according to an embodiment of the present disclosure. FIG. 1B illustrates a prediction system 20 for a module peeling time of the soft electronic fabric module according to an embodiment of the present disclosure. FIGS. 2A-2E illustrate a manufacturing process of the soft electronic fabric module 10 according to an embodiment of the present disclosure.

Figure 2A:
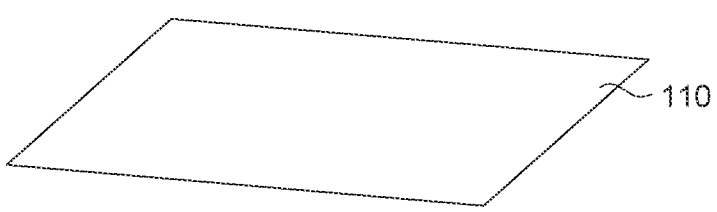
FIGS. 2A-2E illustrate a manufacturing process of the soft electronic fabric module according to an embodiment of the present disclosure.
Figure 2B:
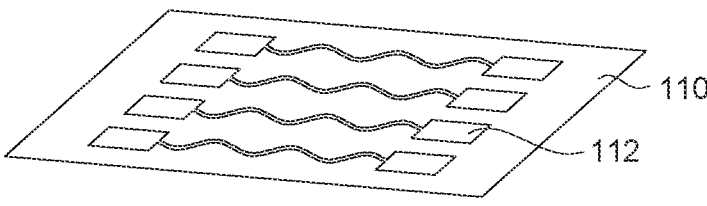
Figure 2C:
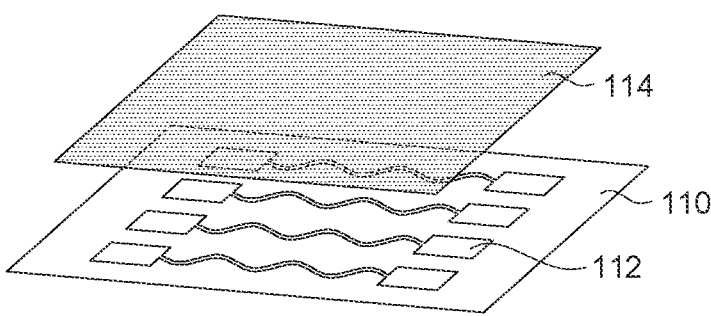
Figure 2D:
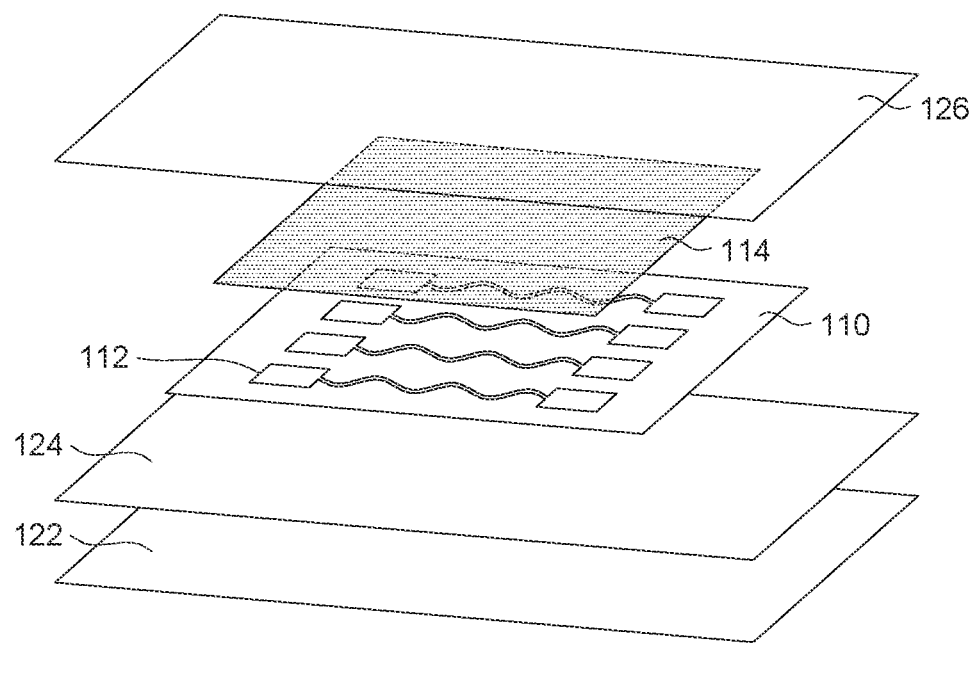
Figure 2E:
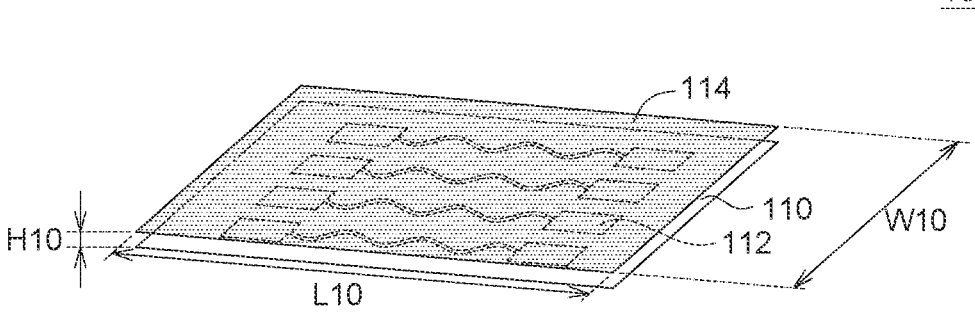

Referring to FIG. 1A, the judging method 10S, for example, includes sequential steps S11-S14. First, please refer to FIGS. 1A and 1B at the same time, as shown in step S11, a plurality of module material combinations 210C are preselected. In one embodiment, a production equipment 200 can be used to provide a plurality of module materials 200M for forming a soft electronic fabric module, and then a plurality of module materials combinations 210C can be randomly preselected from the module materials 200M by a data collection system 210. The module material 200M may include a plurality of substrate materials, a plurality of wire materials, and a plurality of packaging materials. The module material combination 210C may respectively include a substrate material (such as the substrate material 110, as shown in FIGS. 2A-2E), a wire material (such as the wire material 112, as shown in FIGS. 2B-2E), and a packaging material (such as the packaging material 114, as shown in FIGS. 2C-2E). The substrate material (such as the substrate material 110, as shown in FIGS. 2A-2E) can be polyimide (PI), thermoplastic polyurethane (TPU) or other suitable materials; the wire material (such as the wire material 112, as shown in FIGS. 2B-2E) can be silver glue, copper glue or other suitable materials; the packaging material (such as the packaging material 114, as shown in FIGS. 2C-2E) can be thermoplastic polyurethane (TPU), silicone or other suitable materials. The data collection system 210 is, for example, a central processing unit or a smart screening system of soft electronic materials.

As shown in step S12, a plurality of module material combinations 210C are extracted to generate a plurality of module material combination parameters 212P1. In one embodiment, the plurality of module material combinations 210C may be extracted by a measuring device 212 to generate the plurality of module material combination parameters 212P1. The module material combination parameters 212P1 may include a thermal expansion coefficient of the substrate material, a thermal expansion coefficient of the wire material, a thermal expansion coefficient of the packaging material, a heat resistance of the wire material, a heat resistance of the packaging material, and a heat resistance of the substrate material. The measuring device 212 is, for example, any measuring device capable of measuring the thermal expansion coefficient and heat resistance of the substrate material (such as the substrate material 110, as shown in FIGS. 2A-2E), the wire material (such as the wire material 112, as shown in FIGS. 2B-2E) and the packaging material (such as the packaging material 114, as shown in FIGS. 2C-2E). In the present embodiment, the heat resistance of the substrate material (such as the substrate material 110, as shown in FIGS. 2A-2E) is 155° C. to 200° C., and the thermal expansion coefficient of the substrate material (such as the substrate material 110, as shown in FIGS. 2A-2E) is $7 \times 10^{-6}$/K to $147 \times 10^{-6}$/K; a heat resistance of the wire material (such as the wire material 112, as shown in FIGS. 2B-2E) is 155° C. to 300° C., and a thermal expansion coefficient of the wire material (such as the wire material 112, as shown in FIGS. 2B-2E) is $117 \times 10^{-6}$/K to $264 \times 10^{-6}$/K; a heat resistance of the packaging material (such as the packaging material 114, as shown in FIGS. 2C-2E) is 100° C. to 200° C., and a thermal expansion coefficient of the packaging material (such as the packaging material 114, as shown in FIGS. 2C-2E) is $16 \times 10^{-6}$/K to $380 \times 10^{-6}$/K.

As shown in step S13, a plurality of machine learning training data are generated based on a plurality of module material combination parameters 212P1 and a plurality of module pre-processing conditions. According to an embodiment, the substrate material, wire material and packaging material in the module material combination 210C can be processed with a process flow as shown in FIGS. 2A-2E to form a soft electronic fabric module. First, as shown in FIG. 2A, the substrate material 110 is provided. As shown in FIG. 2B, the wire material 112 is formed on the substrate material 110 by a printing process. As shown in FIG. 2C, the packaging material 114 is formed on the substrate material 110 and the wire material 112 through a coating process. As shown in FIG. 2D, the substrate material 110, the wire material 112 and the packaging material 114 are subjected to module pre-processing conditions by a lamination device 214. "Module pre-processing conditions" indicate that before the general lamination process (as shown in FIG. 2E), the pretreatment steps are carried out first, which can include a process temperature range of 120° C. to 150° C. and a process time range of 13 minutes to 15 minutes. For example, the metal plate 122 in the lamination device 214 can heat the substrate material 110, the wire material 112 and the packaging material 114, and the release paper 124 and 126 can be provided under the substrate material 110 and above the packaging material 114, respectively. Thereafter, as shown in FIG. 2E, a lamination process is performed to form the soft electronic fabric module 10. In the present embodiment, the soft electronic fabric module 10 may have a length L10 of 7.5 cm, a width W10 of 3.5 cm, and a height H10 of 0.02 cm to 0.05 cm, but the present disclosure is not limited thereto. According to some embodiments, the soft electronic fabric module may have the length L10 ranging from 5 cm to 10 cm, the width W10 ranging from 2 cm to 5 cm, and the height H10 ranging from 0.01 cm to 0.1 cm.

Thereafter, the module peeling time (such as the module peeling time for training T1) of the soft electronic fabric module 10 formed through the module pre-processing conditions and the lamination process can be measured by an environmental testing device 216. The environmental testing device 216 provides a testing environment in a temperature of 40±2° C. and a relative humidity of 90% to 95%, for example, to test the module peeling time of the soft electronic fabric module 10. The module peeling of the soft electronic fabric module 10 can be the interface peeling between the substrate material 110 and the wire material 112, the interface peeling between the substrate material 110 and the packaging material 114, or/and the interface peeling between the wire material 112 and the packaging material 114. That is, the module peeling time for training T1 may indicate the time it takes for the soft electronic fabric module 10 to produce the above-mentioned module peeling situation in the environmental testing device 216. In one embodiment, the plurality of machine learning training data may include the module material combination parameters 212P1 and the module peeling time for training T1.

As shown in step S14, a machine learning model is trained according to a plurality of machine learning training data to provide an optimized prediction model 218PM to judge the module peeling time. In one embodiment, a model building system 218 may include a machine learning model. In the model building system 218, the machine learning model can be trained through a machine learning process flow (for example, the process flow shown in FIG. 3) to provide an optimized prediction model 218PM.

Figure 3:
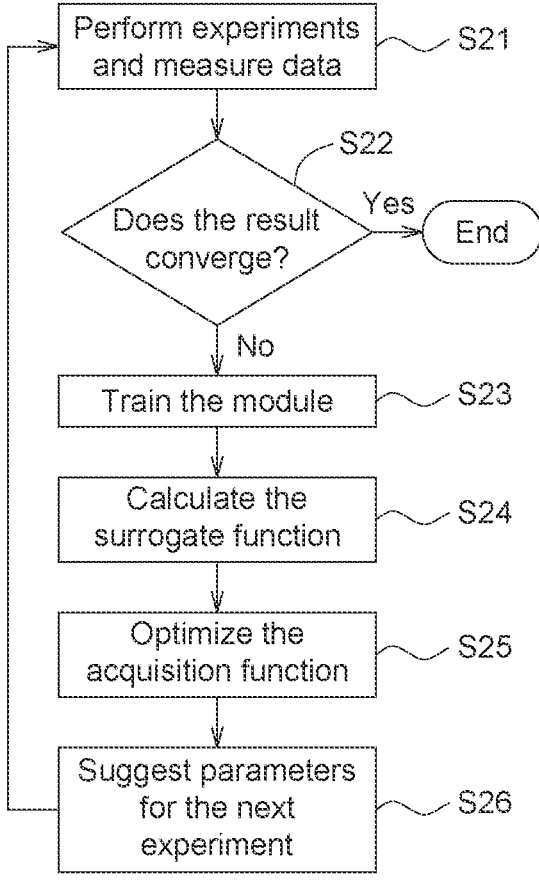
FIG. 3 illustrates the process flow of the machine learning according to an embodiment of the present disclosure.

Referring to FIG. 3, which illustrates the process flow of the machine learning according to an embodiment. As shown in step S21, experiments are carried out and data are measured. For example, the module material combination parameters 212P1 can be measured by the measuring device 212, and the actual module peeling time can be obtained by the environmental testing device 216. As shown in step S22, observe whether the results are similar or the same (that is, convergence); for example, compare the results predicted by the machine learning model (i.e., the predicted module peeling time) with the actual module peeling time (i.e., the experimentally measured module peeling time). If the result converges, the machine learning process of the machine learning model is ended; if the result does not converge, the machine learning process of the machine learning model is continued, that is, proceed to steps S23 to S26: training the model (that is, training the machine learning model by using the machine learning method and framework), calculating the surrogate functions, optimizing the acquisition function, and suggesting parameters for the next experiment; the cycle can be repeated multiple times until the result predicted by the machine learning model (that is, the predicted module peeling time) converges with the actual module peeling time.

In one embodiment, the machine learning model is a Bayesian algorithm. The Bayesian algorithm further includes Scikit learn operation and Gaussian Regression operation. The probability density function shown in the following Formula 1 can be imported to judge the optimizing acquisition function:

$$g(v_1, v_2, \ldots, v_s) = \frac{1}{(2\pi)^{s/2}|K|^{1/2}} \exp\left[\frac{-1}{2}(\bar{v} - \bar{\mu})^T K - 1(\bar{v} - \bar{\mu})\right] \quad \text{Formula 1}$$

According to an embodiment, in Formula 1, v1, v2, v3, v4, v5 and v6 can respectively represent the thermal expansion coefficient of the substrate material, the thermal expansion coefficient of the wire material, the thermal expansion coefficient of the packaging material, the heat resistance of the wire material, the heat resistance of the packaging material, and the heat resistance of the substrate material; $\ddot{\mu}$ can represent the mean vector; K can represent the covariance matrix.

Figure 4A:
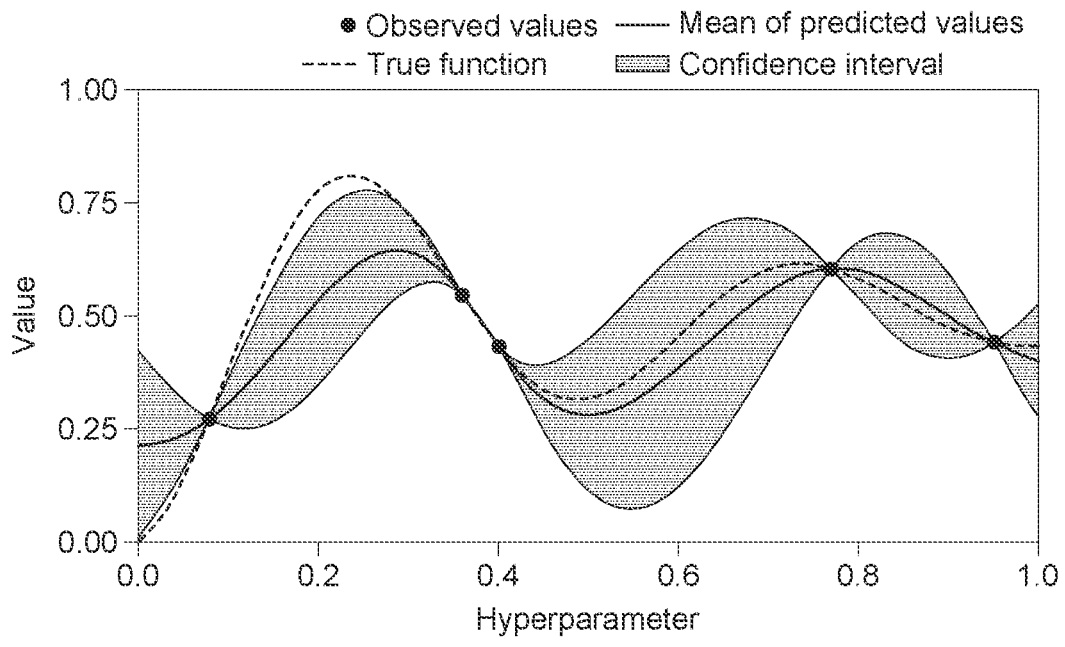
FIGS. 4A and 4B illustrate a Bayesian algorithm according to an embodiment of the present disclosure.
Figure 4B:
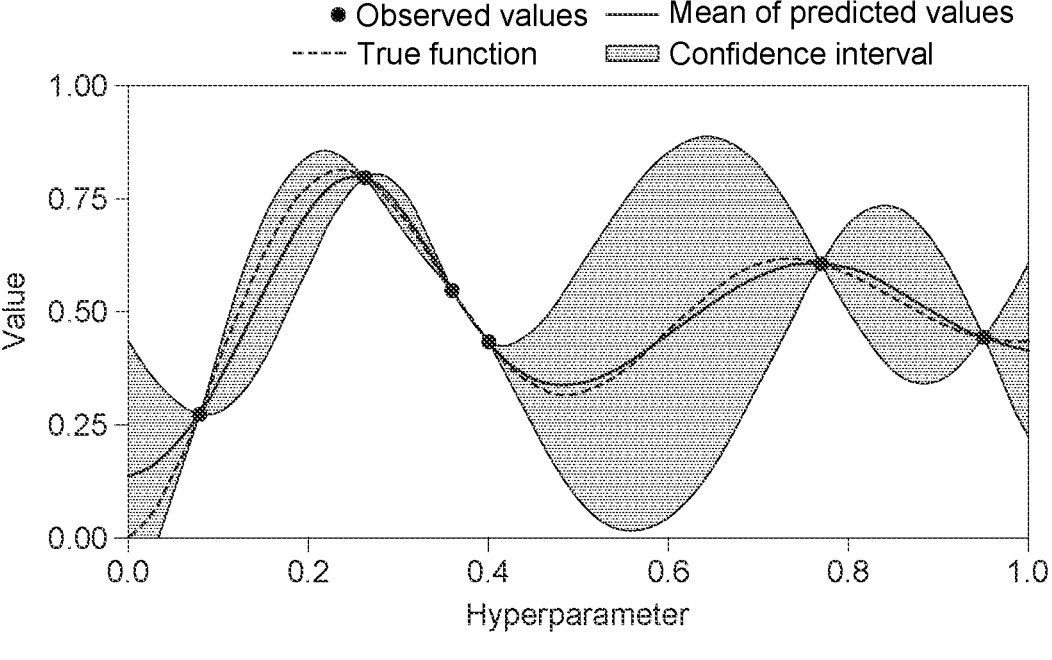

FIGS. 4A and 4B illustrate a Bayesian algorithm according to an embodiment of the present disclosure. As shown in FIGS. 4A and 4B, using the Bayesian algorithm, the result predicted by the machine learning model (i.e., the predicted module peeling time) is more and more consistent with the actual module peeling time (i.e. convergence). In FIGS. 4A and 4B, the X-axis represents hyperparameters and the Y-axis represents values. The curve of the mean of predicted values is, for example, a prediction result of a machine learning model. The curve of the true function is, for example, the correct result (e.g., the actual module peeling time). Referring to FIG. 4A, before training with sufficient or more appropriate machine learning data, the curve of the mean of predicted values of the machine learning model deviates greatly from the curve of the true function. Referring to FIG. 4B, after training with sufficient or more suitable machine learning data (in the present embodiment, it can be based on the machine learning data of the module pre-processing conditions of the module manufacturing process), the curve of the mean of predicted values of the machine learning model deviates less from the curve of the true function, that is, the trend of the two curves is more consistent, and the result tends to converge. FIGS. 4A and 4B are diagrams cited from https://cds.cern.ch/record/2702355/plots.

After the machine learning model is trained according to the above machine learning process, an optimized prediction model 218PM can be provided, and the optimized prediction model 218PM can quickly and accurately predict the module peeling time in an automated manner. Embodiments and comparative examples are given below to verify the effect of the present disclosure, but the present disclosure is not limited to the following contents.

Figure 5:
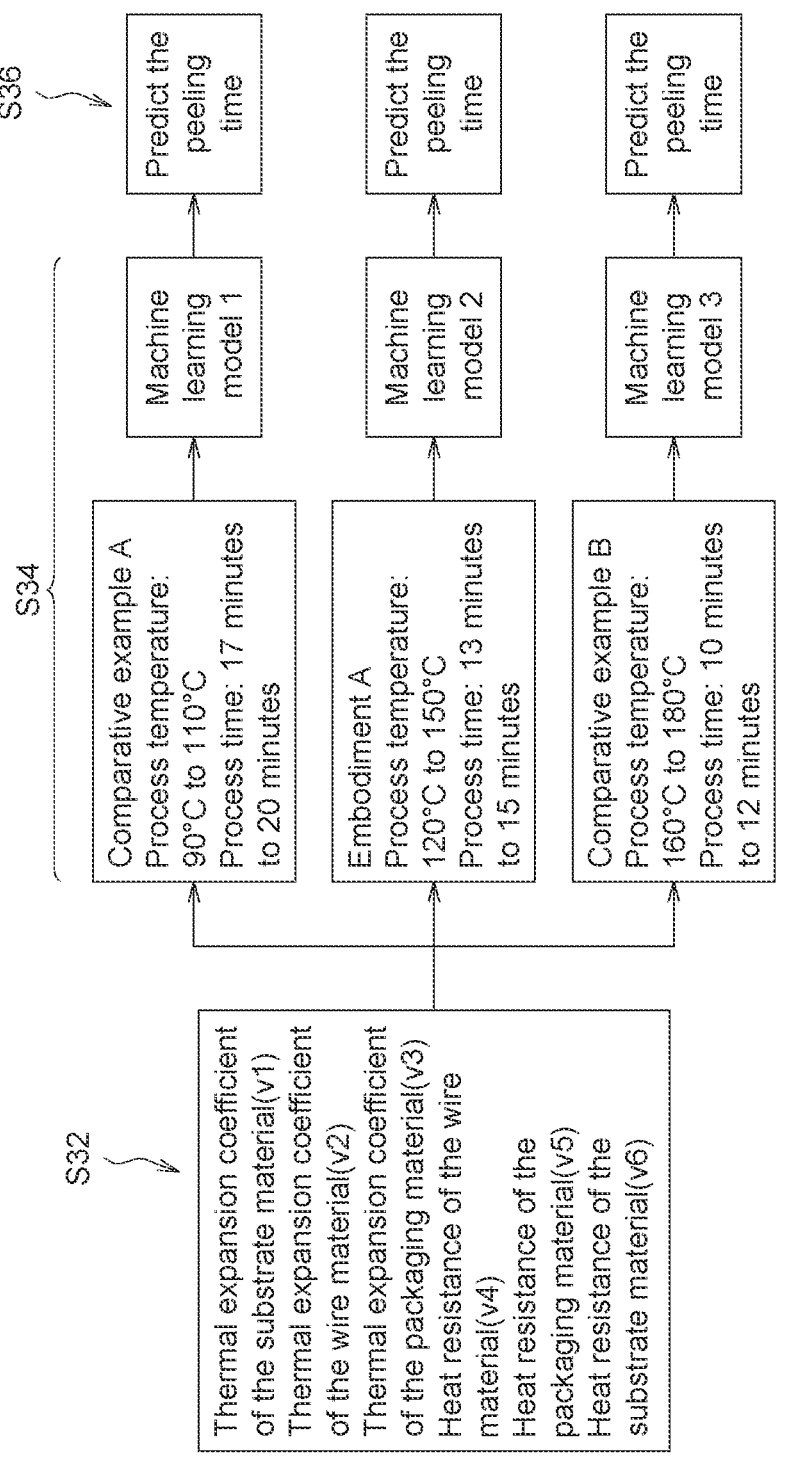
FIG. 5 illustrates a flow chart for predicting the module peeling time of the soft electronic fabric module according to Comparative Example A, Embodiment A and Comparative Example B.

FIG. 5 illustrates a flow chart for predicting the module peeling time of the soft electronic fabric module according to Comparative Example A, Embodiment A and Comparative Example B.

In Comparative example A, Embodiment A and Comparative example B, except that the module pre-processing conditions are different, the other judgment method for the module peeling time are all the same, such as adopting a method similar to the judging method 10S for the module peeling time as shown in FIG. 1. In Comparative example A, the module pre-processing conditions include a process temperature range of 90° C. to 110° C. and a process time range of 17 minutes to 20 minutes. In Embodiment A, the module pre-processing conditions includes a process temperature range of 120° C. to 150° C., and a process time range of 13 minutes to 15 minutes. In Comparative example B, the module pre-processing conditions include a process temperature range of 160° C. to 180° C. and a process time range of 10 minutes to 12 minutes.

Referring to FIG. 5, as shown in step S32, input module material combination parameters in machine learning models 1-3 of Comparative example A, Embodiment A and Comparative example B, respectively. The module material combination parameters include a thermal expansion coefficient of the substrate material v1, a thermal expansion coefficient of the wire material v2, a thermal expansion coefficient of the packaging material v3, a heat resistance of the wire material v4, a heat resistance of the packaging material v5, and a heat resistance of the substrate material v6. As shown in step S34, the machine learning training data generated based on the module pre-processing conditions of the Comparative example A, Embodiment A and Comparative example B are respectively provided to the machine learning models 1-3 for training. As shown in step S36, the trained machine learning models 1 to 3 predict the module peeling time.

The following table 1 presents the experimental results of the above Comparative example A, Embodiment A and Comparative example B. In Experimental Group 1, the required module peeling time is equal to or greater than 36 hours. In Experimental Group 2, the required module peeling time is equal to or greater than 48 hours. In Experimental Group 3, the required module peeling time is equal to or greater than 72 hours. If the required module peeling time is equal to or greater than 36 hours, and the measured module peeling time of a sample (such as a soft electronic fabric module) is 38 hours; the model peeling time predicted by the machine learning model trained through the above steps is 37 hours; the predicted result is consistent with the actual measuring result, and the judgment result is regarded as accurate. If the required module peeling time is equal to or greater than 36 hours, and the measured module peeling time of a sample (such as a soft electronic fabric module) is 38 hours, the model peeling time predicted by the machine learning model trained through the above steps is 32 hours; the predicted result is not consistent with the actual measuring result, and the judgment result is regarded as inaccurate.

TABLE 1

| | Prediction accuracy of Comparative example A (%) | Prediction accuracy of Embodiment A (%) | Prediction accuracy of Comparative example B (%) |
|---|---|---|---|
| Experimental Group 1 | 80 | 100 | 80 |
| Experimental Group 2 | 70 | 100 | 80 |
| Experimental Group 3 | 70 | 100 | 70 |

From the results in Table 1, it can be seen that the prediction accuracy of Embodiment A is as high as 100% in all of Experimental groups 1-3. In contrast, the prediction accuracies of Comparative Example A and Comparative Example B are much lower than the prediction accuracy of Embodiment A. Therefore, the difference in the module pre-processing conditions will affect the prediction accuracy of the module peeling time of the machine learning model. A highly reliable machine learning model can only be trained after training with the machine learning training data generated by the optimized module pre-processing conditions.

Compared with the comparative example that does not generate machine learning training data based on the module pre-processing conditions, or the comparative example that the module pre-processing conditions are different from that of the present disclosure, since the present disclosure generates a plurality of machine learning training data (including module material combination parameters 212P1 and module peeling time for training T1) based on the module materials combination parameters 212P1 and the optimized module pre-processing conditions (i.e., a process temperature range of 120° C. to 150° C. and a process time range of 13 minutes to 15 minutes), a machine learning model is trained according to the plurality of machine learning training data to provide an optimized prediction model 218PM, and the module peeling time predicted by the optimized prediction model 218PM can be more accurate. The optimized prediction model 218PM is mainly used in the judgment of the module peeling time of the soft electronic fabric module.

According to one embodiment of the present disclosure, it is possible to utilize the optimized module pre-processing conditions and provide a small amount of machine learning training data to train the machine learning model, and an optimized prediction model having a high accuracy of judgment of the module peeling time can be produced. In this way, the complicated judgment method that needs to provide a large amount of machine learning training data to improve the judgment accuracy of the module peeling time can be replaced. In other words, the judging method for the module peeling time of the soft electronic fabric module in the present disclosure provides an automatic and fast judgment method, which can achieve the purpose of reducing a large number of experiments and has high reliability and accuracy.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A judging method for a module peeling time of a soft electronic fabric module, comprising:
   preselecting a plurality of module material combinations, the plurality of module material combinations respectively comprising a substrate material, a wire material and a packaging material;
   extracting the plurality of module material combinations to generate a plurality of module material combination parameters;
   generating a plurality of machine learning training data based on the plurality of module material combination parameters and a plurality of module pre-processing conditions; and
   training a machine learning model according to the plurality of machine learning training data to provide an optimized prediction model for judging a module peeling time.

2. The judging method for a module peeling time of a soft electronic fabric module according to claim 1, wherein one of the plurality of module pre-processing conditions further comprises:
   a process temperature range of 120° C. to 150° C. and a process time range of 13 minutes to 15 minutes.

3. The judging method for a module peeling time of a soft electronic fabric module according to claim 1, wherein one of the plurality of module material combination parameters further comprises:
   a thermal expansion coefficient of the substrate material, a thermal expansion coefficient of the wire material, a thermal expansion coefficient of the packaging material, a heat resistance of the wire material, a heat resistance of the packaging material, and a heat resistance of the substrate material.

4. The judging method for a module peeling time of a soft electronic fabric module according to claim 1, wherein the machine learning model is a Bayesian algorithm.

5. The judging method for a module peeling time of a soft electronic fabric module according to claim 4, wherein the Bayesian algorithm further comprises a Scikit learn operation and a Gaussian Regression operation.

6. A judging method for a module peeling time of a soft electronic fabric module, comprising:
   preselecting a plurality of module material combinations, the plurality of module material combinations respectively comprising a substrate material, a wire material and a packaging material;
   extracting the plurality of module material combinations to generate a plurality of module material combination parameters;

generating a plurality of machine learning training data based on the plurality of module material combination parameters and a plurality of module pre-processing conditions; and training a machine learning model according to the plurality of machine learning training data to provide an optimized prediction model for judging a module peeling time, wherein a heat resistance of the substrate material is 155° C. to 200° C., and a thermal expansion coefficient of the substrate material is 7 $10^{-6}$/K to 147 $10^{-6}$/K; a heat resistance of the wire material is 155° C. to 300° C., and a thermal expansion coefficient of the wire material is 117 $10^{-6}$/K to 264 $10^{-6}$/K; a heat resistance of the packaging material is 100° C. to 200° C., and a thermal expansion coefficient is 16 $10^{-6}$/K to 380 $10^{-6}$/K.

7. The judging method for a module peeling time of a soft electronic fabric module according to claim 6, wherein one of the plurality of module pre-processing conditions further comprises:

a process temperature range of 120° C. to 150° C. and a process time range of 13 minutes to 15 minutes.

8. The judging method for a module peeling time of a soft electronic fabric module according to claim 6, wherein one of the plurality of module material combination parameters further comprises:

a thermal expansion coefficient of the substrate material, a thermal expansion coefficient of the wire material, a thermal expansion coefficient of the packaging material, a heat resistance of the wire material, a heat resistance of the packaging material, and a heat resistance of the substrate material.

9. The judging method for a module peeling time of a soft electronic fabric module according to claim 6, wherein the machine learning model is a Bayesian algorithm.

10. The judging method for a module peeling time of a soft electronic fabric module according to claim 9, wherein the Bayesian algorithm further comprises a Scikit learn operation and a Gaussian Regression operation.

11. A prediction system for a module peeling time of a soft electronic fabric module, comprising:

a data collection system, preselecting a plurality of module material combinations, wherein the plurality of module material combinations respectively comprises a substrate material, a wire material and a packaging material;

a measuring device, extracting the plurality of module material combinations to generate a plurality of module material combination parameters;

a lamination device, performing a plurality of module pre-processing conditions to the plurality of module material combinations;

an environmental testing device, measuring a plurality of module peeling time for training of the plurality of module material combinations after performing the plurality of module pre-processing conditions; and a model building system, generating a plurality of machine learning training data based on the plurality of module material combination parameters and the plurality of module peeling time for training, and training a machine learning model according to the plurality of machine learning training data to provide an optimized prediction model for judging a module peeling time.

12. The prediction system for a module peeling time of a soft electronic fabric module according to claim 11, wherein one of the plurality of module pre-processing conditions further comprises:

a process temperature range of 120° C. to 150° C. and a process time range of 13 minutes to 15 minutes.

13. The prediction system for a module peeling time of a soft electronic fabric module according to claim 11, wherein one of the plurality of module material combination parameters further comprises:

a thermal expansion coefficient of the substrate material, a thermal expansion coefficient of the wire material, a thermal expansion coefficient of the packaging material, a heat resistance of the wire material, a heat resistance of the packaging material, and a heat resistance of the substrate material.

14. The prediction system for a module peeling time of a soft electronic fabric module according to claim 11, wherein the machine learning model is a Bayesian algorithm.

15. The prediction system for a module peeling time of a soft electronic fabric module according to claim 14, wherein the Bayesian algorithm further comprises a Scikit learn operation and a Gaussian Regression operation.

* * * * *